Oct. 15, 1963 S. LASSA 3,107,077
SELF-POSITIONING REAR VISION TRUCK MIRROR ASSEMBLY
Filed Dec. 14, 1961 2 Sheets-Sheet 1

INVENTOR.
STANLEY LASSA
BY Norman T. Gerlach
ATT'Y.

Oct. 15, 1963    S. LASSA    3,107,077
SELF-POSITIONING REAR VISION TRUCK MIRROR ASSEMBLY
Filed Dec. 14, 1961    2 Sheets-Sheet 2

INVENTOR.
STANLEY LASSA
BY
ATT'Y.

United States Patent Office 3,107,077
Patented Oct. 15, 1963

3,107,077
SELF-POSITIONING REAR VISION TRUCK
MIRROR ASSEMBLY
Stanley Lassa, Chicago, Ill., assignor to 3435 Incorporated, Chicago, Ill., a corporation of Illinois
Filed Dec. 14, 1961, Ser. No. 159,349
2 Claims. (Cl. 248—282)

The present invention relates generally to automotive rear vision mirror structures and more particularly to a novel form or type of self-positioning rear vision mirror which is designed for use especially in connection with a commercial truck or a tractor-trailer combination, the mirror in both instances being mounted on the power driven vehicle, i.e., the truck or tractor.

Ordinarily in a tractor-trailer combination the width of the trailer exceeds the width of the tractor by a considerable margin so that a rear vision mirror setting which is correct for the driver of the tractor when he is "bobtailing" i.e., when the trailer is not attached to the tractor, is incorrect for him when the trailer is being pulled. There are thus two rear vision mirror settings or adjustments which will effectively accommodate the driver in both instances, bearing in mind, of course, the fact that when the trailer is attached to the tractor a proper mirror adjustment must be made for straight road driving with the trailer attached to the tractor in longitudinal alignment with the latter. Inasmuch as, in commercial practice, the trailer of a tractor-trailer combination is usually picked up by the tractor in the warehouse yard or at a warehouse loading and unloading platform, proper mirror adjustments are not made at the time of departure. Usually they are made after the driver has reached a stretch of straight road and while he is in motion thereon. The making of such mirror adjustments en route is distracting and, therefore, to a certain extent hazardous.

In a tractor-trailer combination, when the trailer is attached to the tractor, it usually is necessary for proper rear vision for the mirror to be laterally displaced from the driver's cab an appreciable distance. As a result of this, it frequently is necessary for the driver to pull in the mirror to clear objects which he is approaching, or to clear passing objects as, for example, when he enters a narrow passageway or drives around the corner of a close building. After a situation of this character has been met, it becomes necessary for the driver again to readjust the mirror for proper rear vision and, to do this, he must again wait a stretch of straight road.

Another cause which contributes toward frequent rear vision mirror adjustments on the part of a driver is accidental displacement of the mirror from its proper setting. Many rear vision mirrors are mounted on and movable with truck doors or the doors of the cabs of tractors so that upon opening of the doors the mirrors will strike against adjacent objects and thus become displaced. Occasionally a rear vision mirror will be displaced by contact with an adjacent object while the truck or tractor is being operated and in motion.

In any event, and regardless of whether displacement of a rear vision truck mirror is voluntary or involuntary, the adjustments which are made to restore the mirror to its proper setting are fine adjustments and must painstakingly be made on an empirical basis and with the truck or tractor-trailer combination actually in transit and on a straight stretch of road.

The present invention is designed to overcome the above-noted limitations that are attendant upon the construction and use of present day rear vision mirrors for truck or tractor-trailer combination use and, toward this end, the invention contemplates the provision of a novel mirror mounting structure by means of which one or more ideal or correct mirror settings may be established empirically for the mirror of any given truck or tractor-trailer combination, and also contemplates the provision of certain detent means which is associated with the mirror mounting structure and is permanently arranged or adjusted so that it will be effective to maintain the mirror selectively in any one of such mirror settings. According to the present invention, such detent means is automatically released either when a predetermined degree of involuntary impact is applied to the mirror frame or when the mirror frame is purposely pulled from any one of the positions in which it is being held by the detent means. However, after the mirror frame has thus been dislodged and moved to an off-position, either involuntarily or voluntarily, it is capable of being readily restored to the desired predetermined position by the mere act of snapping it into place.

The provision of a rear vision mirror mounting structure of the aforementioned character being among the principal objects of the invention, a further object is to provide such a mounting structure which, in the main, is comprised of tubular steel parts, the latter being operatively connected together and having the detent means associated with them in a novel manner.

Another object of the invention is to provide a rear vision mirror mounting structure of the type under consideration and wherein the mirror frame is capable of being adjusted through an infinite range of positions independently of the selected positions established for it by the detent means, thus allowing the driver of the truck or tractor-trailer combination to take care of special situations where an unusual mirror angle is required.

The provision of a rear vision mirror mounting structure or assembly which is comprised of relatively few parts, particularly moving parts, and which, therefore, is unlikely to get out of order; one which is rugged and durable and will, therefore, withstand rough usage; one which is capable of ease of assembly and dismantlement for purposes of inspection of parts, replacement or repair; one in which all necessary adjustments may be made manually and without the aid of tools; one which is attractive in its appearance and pleasing in its design; and one which otherwise is well adapted to perform the services required of it, are further desirable features which have been borne in mind in the production and development of the present invention.

In the accompanying two sheets of drawings forming a part of this specification, one illustrative embodiment of the invention has been shown.

Figure 1:
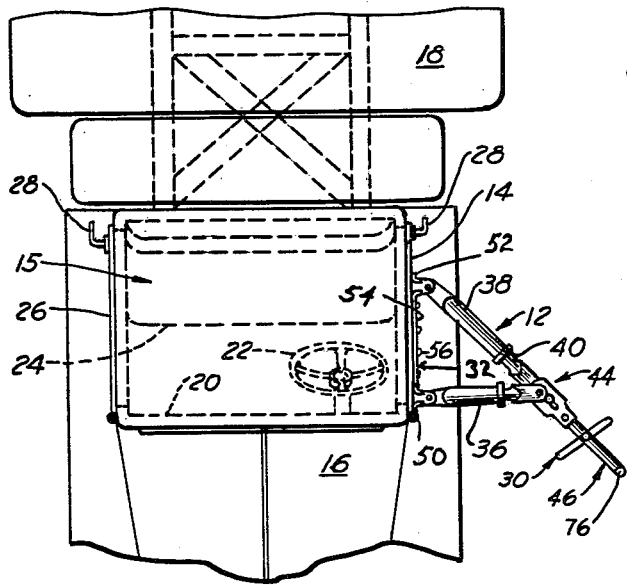
FIG. 1 is a fragmentary top plan view of a tractor-trailer combination showing the improved rear vision mirror structure or assembly operatively applied to the driver's entrance door of the tractor cab.

Referring now to the drawings in detail and in particular to FIG. 1, a rear vision mirror structure or assembly has been designated in its entirety by the reference numeral 12 and it is shown as being operatively installed upon the driver's entrance door 14 of the cab 15 of a tractor 16, the latter constituting the control and motivating section of a tractor-trailer combination including a trailer 18. The mirror assembly serves to permit the driver of the combination to view objects on the highway in back of the tractor whether with or without the trailer of the combination attached thereto. The tractor-trailer combination may be of any conventional design and as clearly shown in FIG. 1, the width of the trailer 18 is somewhat greater than the width of the cab 15. The tractor 16 is equipped with the usual driver's operating equipment and appointments including, among other things, an instrument panel 20, a steering wheel 22 and a driver's seat 24. In addition to the driver's entrance door 14, the cab of the tractor 16 is provided with a passenger's door 26, both doors being window-equipped and having suitable operating handles 28. The rear vision mirror assembly 12 is shown in FIG. 1 as being mounted on the driver's entrance door 14 but it will be understood that it may, with or without modification as required, be applied to the door 26 or some other part of the cab of the tractor.

Figure 2:
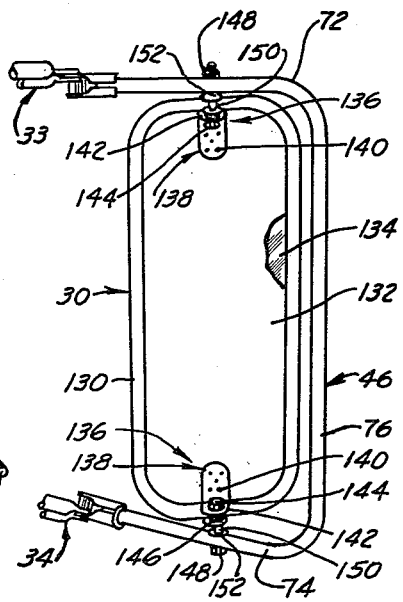
FIG. 2 is an enlarged fragmentary rear elevational view of the assembly.

The mirror assembly 12 involves in its general organization certain elements which are of well-known construction and design and have become standardized in the industry so that they constitute the basic parts of numerous manufacturers of rear vision mirror assemblies. One of such elements or parts is the mirror such as the unit 30 of the assembly 10. Other of such parts are a pair of vertically spaced horizontally extending bracket arrangements 32, and upper and lower arm arrangements 33 and 34 (see FIGS. 2 and 3). Each arm arrangement comprises front and rear horizontally extensible and contractible telescopic type tubular arms 36 and 38 (see FIG. 3). Associated with each arm is a slip connection 40 whereby the arm may be lengthened or shortened, such slip connection including a locking or set screw 42.

The inner ends of the arms 36 and 38 are pivotally connected to bracket arrangements 32 and the outer ends of the arms overlie or cross one another and are connected by means of three-way detent assemblies 44 to a C-frame 46 which carries the mirror unit 30, the latter being pivoted within the confines of the C-frame 46 for swinging or turning movements in either direction about a vertical axis. The detent assemblies 44 constitute one of the principal features of the present invention and will be described in detail hereafter.

Each bracket arrangement 32 comprises front and rear angle brackets 50 and 52 and an intermediate spacer bracket 54, the three brackets being adapted to be secured in horizontally aligned relationship to the door 14 by means of screws 56 or other suitable fastening devices. Secured by bolt and nut assemblies 57 (see FIG. 2) between the intermediate brackets 52 and the brackets 50 and 52 are pivot brackets 58, the inner ends of the telescopic arms 36 and 38 being pivoted to the pivot brackets 58 by means of bolt, washer and nut assemblies 60.

The arrangement thus far described is conventional insofar as the present invention is concerned and no claim is made herein to any novelty in the design or construction of the telescopic arms 36 and 38 of the arm arrangements 33 and 34 or to the manner in which the inner ends thereof are attached to the door 14, the present invention residing rather in the specific mounting structure for the mirror unit 30 at the outer ends of the arms 36 and 38.

Referring now to FIGS. 3 to 6, inclusive, the outer ends of the telescopic arms 36 and 38 of the arm arrangements 33 and 34 have flattened portions 62 and 64, respectively. The flattened portions 64 of the arms 38 have welded thereto as at 66 relatively thick cylindrical detent cams 68. The flattened ends of the telescopic arms 36 and 38 are secured together by thru-bolts 70, the bolts serving additionally to retain certain other parts of the detent assemblies 44 in position as will become clear presently.

The previously mentioned C-frame 46 includes upper and lower parallel horizontally extending side arms 72 and 74 and a vertical connecting bight arm 76. The free ends of the side arms 72 and 74 are each connected in one of the detent assemblies 44 by means of a split clamping yoke which is comprised of identical counterpart yoke arms or sections 78 and 80. Each yoke section includes a semi-cylindrical outer end part 82 and a flat inner end part 84, the terms "outer" and "inner" referring to the relationship of the end parts to the detent assemblies 44 as a whole.

The flat inner end parts 84 of the yoke sections 78 are interposed between the flattened ends 62 and 64 of the telescopic arms 36 and 38. The flat inner end parts 84 of the yoke sections 80 are interposed between the lower faces 86 of the cylindrical detent cams 68 and clamping nuts 88 which are threadedly received on the lower ends of the shank portions 89 of the bolts 70. Washers 90 are interposed between the flat inner ends 84 of the yoke sections 80 and the nuts 88. Similar washers 92 are interposed between the heads 94 of the bolts 70 and the flattened portions 62 of the telescopic arms 36. Additional washers 96 are interposed between the lower faces of the detent cams 68 and the flat inner end parts 84 of the yoke sections 80. In addition, washers 98 are interposed between the opposed faces of the flattened portions 64 of the telescopic arms 38 and the flat inner end parts 84 of the yoke sections 78. The bolts 70 thus pass through the washers 92, the flattened portions 62, the flat inner end parts 84, the washers 98, the flattened portions 64, the detent cams 68, the washers 96, the flat inner end parts 84 and the washers 90 in the order named. The semi-cylindrical outer end parts 82 of the yoke sections straddle and engage the cylindrical outside surfaces of the outer or free ends of the side arms 72 and 74 of the C-frame 46. Bolts 99 pass through the semi-cylindrical outer end parts 82 and the outer ends of the arms 72 and 74 and serve to hold such parts in firmly clamped relation. Washers 100 are interposed between the heads 102 of the bolts 99 and the semi-cylindrical outer end part 82 of the yoke sections 78. Similar washers 104 are interposed between the semi-cylindrical outer end parts 82 of the yoke sections 80 and clamping nuts 106 on the shank portions 108 of the bolts 99. The bolts 92 thus pass through the washers 100, the outer end parts 82 of the yoke sections 78, the outer ends of the side arms of the C-frame 46, the outer end parts 82 of the yoke sections 80 and the washers 104 in the order named.

Figure 4:
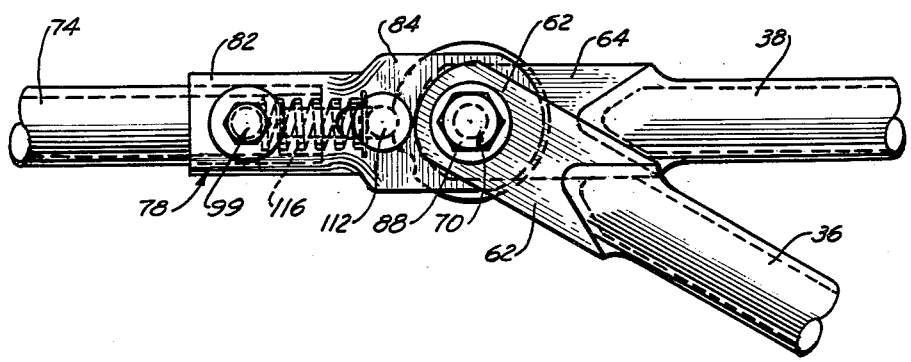
FIG. 4 is an enlarged fragmentary plan view of one of two identical tubing joints which are employed in connection with the assembly.
Figure 5:
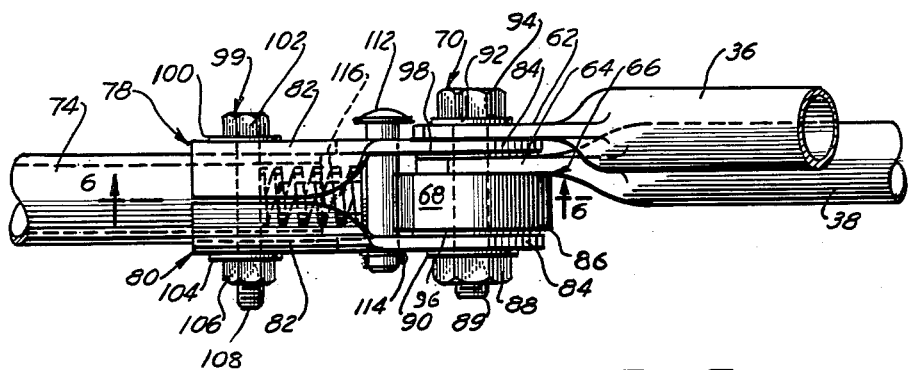
FIG. 5 is a side elevational view of the tubing joint which is shown in FIG. 4.
Figure 6:
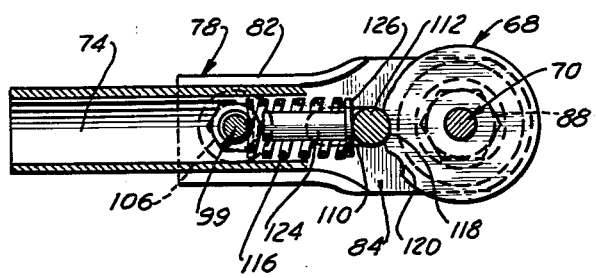
FIG. 6 is a section taken on the line 6—6 of FIG. 5.

As best shown in FIGS. 4, 5 and 6, the yoke sections 78 and 80 are provided with elongated slots 110 at the junctures between their end parts 82 and 84. Combined thrust pins and detent cam followers 112 pass loosely through the slots 110 and bridge the distance between the yoke sections. Cotter pins 114 serve to retain the thrust pins and cam followers 112 in position within the slots. Relatively strong compression springs 116 are interposed between the bolts 92 and combined thrust pins and cam followers 112 and serve normally to urge the latter forwardly against the detent cams 68. Each detent cam is formed with a plurality of peripheral detent notches in the cylindrical side thereof, two such notches 118 and 120 being provided in the present instance. The combined thrust pins and cam followers 112 are designed to ride on the smooth cylindrical outer sides of the cams 68 and snap into position in the various notches for mirror locating purposes in a manner that will be described more in detail hereafter. Spring-centering pins 124 are telescopically received within the springs 116 and have head portions 126 which bear at all times against the adjacent sides of the combined thrust pins and cam followers 112.

The mirror unit 30 involves in its general organization a substantially rectangular frame 130 across which there extends a mirror backing plate 132 to which the mirror proper 134 is affixed, the mirror being coextensive with the plate. The frame 130 is pivotally mounted in the previously mentioned C-frame 46 by means of upper and lower trunnion assemblies 136 of identical construction. Each trunnion assembly includes an attachment bracket 138 which is spot welded as at 140 to the mirror backing plate 132 and presents a lateral or horizontal ear 142. Trunnion bolts 144 are fastened to the ears 142 by means of clamping nuts 146. They project through holes in the central portions of the side arms of the C-frame 46 and have clamp nuts 148. Spacer sleeves 150 and washers 152 are mounted on the shanks of the bolts 144 and extend between the ears 142 and the side arms 72 and 74 of the C-frame. The mirror unit 30 is thus angularly adjustable within the C-frame 46 and is capable of being turned about a vertical axis. Ordinarily, a fixed setting of the mirror unit 30 with respect to the C-frame 46 will be effected for any given installation and the clamp nuts 148 will be drawn tight to maintain the setting.

It has previously been set forth that in normal tractor-trailer operation two precise mirror settings are required, one for a situation where the driver is "bobtailing" and the tractor is being driven without the trailer and the other where the trailer is being hauled or pulled by the tractor. The two detent notches 118 and 120 (see FIG. 6) are so disposed on the peripheries or sides of the cylindrical detent cams 68 that when the combined thrust pins and cam followers 112 are disposed in the notches 118 the mirror unit 30 will assume the correct setting for operation of the tractor alone, and that when the combined thrust pins and cam followers 112 are in the notches 120 the mirror unit will assume the correct setting for combined operation of the tractor and its trailer. These two mirror settings are necessary due to the fact that the trailer 18 ordinarily is wider than the driver's cab 15 and also to the fact that the trailer possesses appreciable length so that any mirror setting which will accommodate tractor operation alone will cause all or a portion of the trailer image to appear in the mirror proper 134 and thus obstruct the desired view of the trailing road or highway when the trailer is being hauled.

Figure 3:
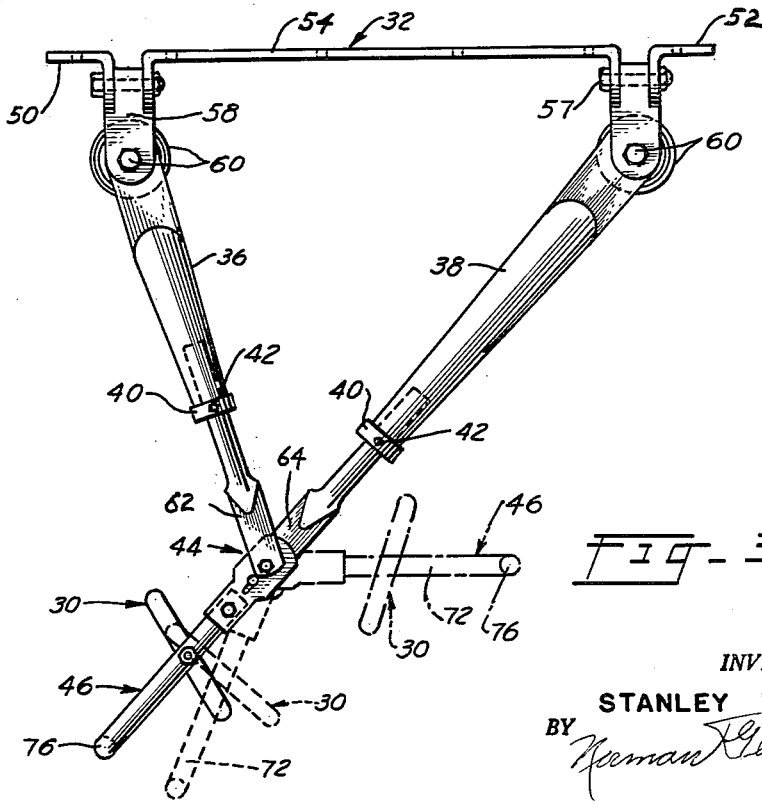
FIG. 3 is an enlarged top plan view of the rear vision mirror assembly, the assembly being shown in full lines in one of its normal positions, in dotted lines in another normal position, and in broken lines in an off-position.

The adjustments of which the mirror unit 30 are capable are infinite since the combined thrust pins and cam followers 112 are capable of riding on the cylindrical sides of the detent cams 68, as well as in the notches 118 and 120. The displacement of the mirror unit 30 which is necessary to move the same from one detent controlled position to the other detent controlled position is not great and only a small angular displacement is required to delete the reflected view of the trailer from the field of view when the trailer is connected to the tractor. Therefore, the notches 118 and 120 are relatively close together on the peripheries or sides of the detent cams 68. In FIG. 3, the full line position of the C-frame 46 and of the mirror unit 30 represents the position assumed by these parts when the combined thrust pins and cam followers 112 are disposed in the detent notches 118 and the mirror unit is in the proper position for rear vision viewing with the tractor-trailer combination complete. The dotted line position of these parts represents the position assumed thereby when the trailer has been disconnected from the tractor. The broken line position of the parts represents a retracted position of the same as, for example, a desired out-of-the-way position to enable the parts to clear a passing object.

The transition from one position of the mirror to another may be made manually by the operator without requiring the use of tools. It is merely necessary for the operator to apply a moderate degree of force to the C-frame 46 in either direction, at which time the force of the springs 116 will be overcome and the combined thrust pins and cam followers 112 will leave the notches in which they may be seated and move onto smooth portions of the cylindrical sides of the detent cams 68 so that the C-frame may be manipulated further as desired. As the combined thrust pins and cam followers 112 approach either set of detent notches, they will snap into position within the adjacent notches and thus cause the C-frame 46 and consequently the mirror unit 30, which is fixedly mounted on the C-frame, to assume the desired position for rear vision viewing with the trailer 18 connected to or disconnected from the tractor 16 as the case may be.

Occasionally a driver will inadvertently misjudge a distance and the C-frame 46 will strike a passing object as, for example, when he is maneuvering his tractor through a tight place. In such an instance, the degree of torque applied to the C-frame will be sufficient to dislodge the combined thrust pins and cam followers from either set of notches and allow the C-frame and its contained mirror unit 30 to be automatically pushed to an out-of-way position.

The invention is not to be limited to the exact arrangement of parts shown in the accompanying drawings or described in this specification as various changes in the details of construction may be resorted to without departing from the spirit of the invention. Therefore, only insofar as the invention has particularly been pointed out in the accompanying claims is the same to be limited.

Having thus described the invention what I claim as new and desire to secure by Letters Patent is:

1. A rear vision mirror assembly adapted to be attached to and extend outwardly from the driver's entrance door of the cab of a tractor and including a mirror unit movable between a first position wherein the setting thereof will accommodate a driver's rear vision view when the tractor is devoid of a trailer and a second position wherein the setting thereof will accommodate the driver's rear vision view when a trailer is operatively attached to the tractor, said mirror assembly comprising, in combination, a pair of vertically spaced upper and lower composite telescopic extensible and contractible front supporting arms, a pair of vertically spaced upper and lower composite telescopic extensible and contractible rear supporting arms, means at the inner ends of said arms for attaching the arms to said entrance door so that the inner ends of the rear arms lie in common horizontal planes with but are spaced rearwardly from the inner ends of the front arms of the associated pairs, the distal end of each arm being flattened, a cylindrical detent cam having one end face fixedly secured to the flattened distal end of one of each pair of supporting arms, yokes having parallel yoke arms straddling the cams and an interconnecting yoke base, thru-bolts passing through the yoke arms of said yokes, the detent cams and the flattened distal ends of the arms, said detent cams being formed with first and second detent notches in their cylindrical peripheries, said yoke being formed with opposed slots therein, cam follower pins bridging the distance between the yoke arms and having their opposite ends slidable in said slots, said cam follower pins being selectively engageable with said first and second detent notches, a C-frame including upper and lower parallel side arms and a connecting vertical bight arm, bolts securing the distal ends of the side arms to the yoke bases, whereby the C-frame is capable of horizontal swinging movements in either direction bodily with the yokes, said mirror unit being carried by said C-frame, and compression springs interposed between said bolts and cam follower pins and normally urging the latter against the detent cams, said first detent notches being so disposed on the cylindrical peripheries of the detent cams that when the cam followers are engaged with said first notches said mirror unit is in said first position, and when the cam followers are engaged with the second notches said mirror unit is in said second position.

2. A rear vision mirror assembly as set forth in claim 1 and wherein the detent cams are secured to the flattened ends of the rear upper and lower supporting arms, respectively, and wherein the flattened ends of the front upper and lower supporting arms lie outside the confines of the adjacent yoke sections, and each thru-bolt passes through the adjacent flattened end of a front supporting arm, a yoke arm, the flattened end of a rear supporting arm, a detent cam, and a second yoke arm in the order named.

References Cited in the file of this patent

UNITED STATES PATENTS

| | | | |
|---|---|---|---|
| 1,921,310 | Crisman | | Aug. 8, 1933 |
| 2,631,498 | Barkley | | Mar. 17, 1953 |
| 2,671,367 | Modin | | Mar. 9, 1954 |
| 2,839,965 | Budreck | | June 24, 1958 |
| 2,969,715 | Mosby | | Jan. 31, 1961 |

FOREIGN PATENTS

| | | |
|---|---|---|
| 854,885 | Great Britain | Nov. 23, 1960 |